Aug. 4, 1953 F. WHITWORTH 2,647,404
METER TOP AND INDEX BOX
Filed Oct. 19, 1949
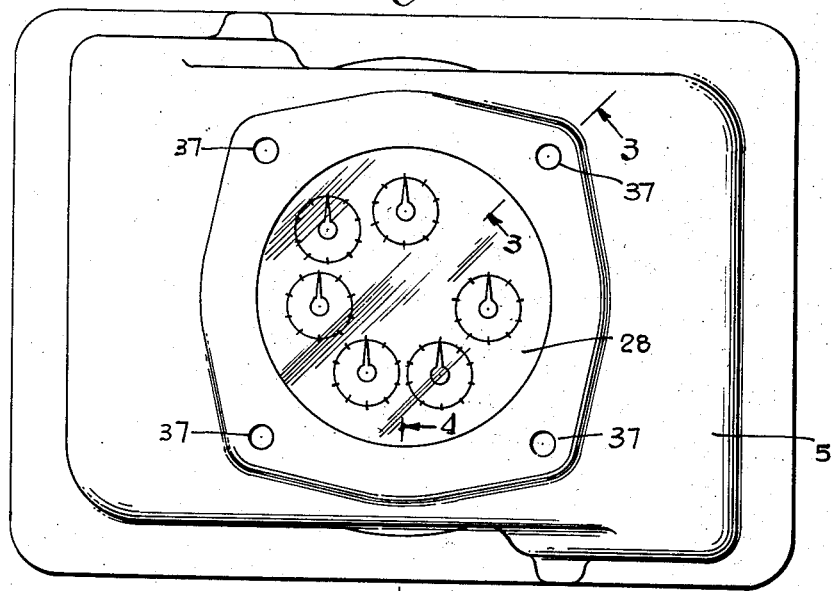
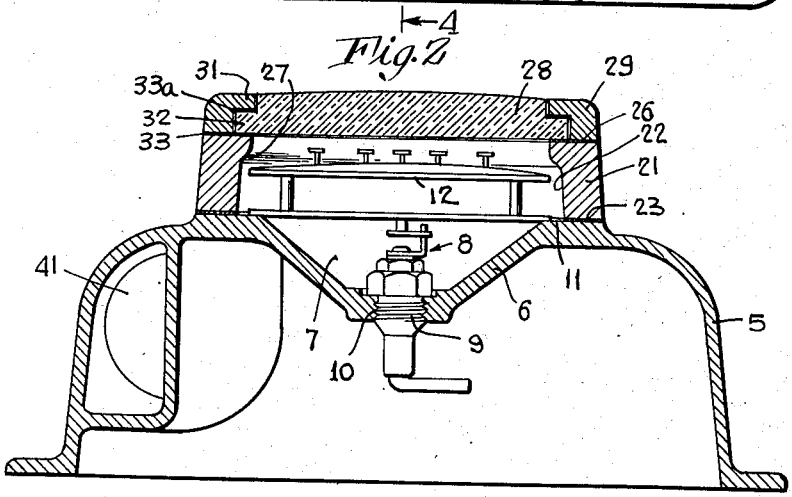
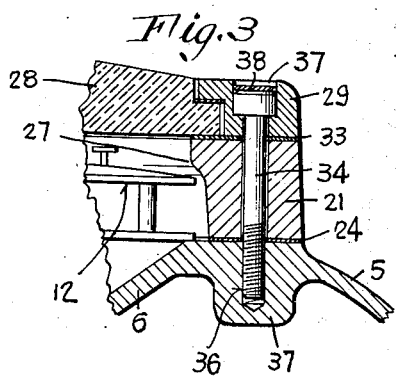
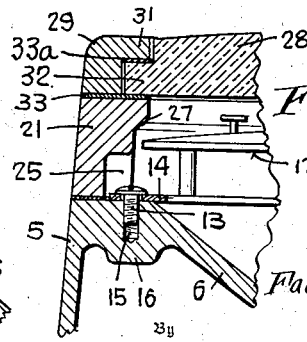
Inventor
Fairchild Whitworth
By
Johnson and Kline
Attorneys Patented Aug. 4, 1953

2,647,404

UNITED STATES PATENT OFFICE 2,647,404

METER TOP AND INDEX BOX

Fairchild Whitworth, Fairfield, Conn., assignor to Sprague Meter Company, Bridgeport, Conn., a corporation of Connecticut Application October 19, 1949, Serial No. 122,268

5 Claims. (Cl. 73—273)

This invention relates to fluid meters such, for example, as gas flow meters which are frequently installed in exposed locations or even underground. It relates especially to the register-enclosing tops for the meter boxes which support and enclose the index mechanism in a leak-tight manner, both to prevent leakage from the meter box and to keep external moisture out of the register mechanism.

Heretofore, meter box tops have frequently been so constructed as to require relatively difficult threading and machining operations in their production which have constituted a substantial item in the cost of manufacture.

An object of this invention is to so simplify the construction of register-enclosing tops for meter boxes as to eliminate from their manufacture difficult or time consuming machining operations and thus reduce the cost of production.

A feature of the invention is the provision of a meter box top having a form which can be easily made by simple castings and inexpensive machining operations. The arrangement is such that the register is mounted on the exterior of the main casing of the top in a manner to be enclosed and sealed by a simple cover mechanism formed of easily made parts which require no threading or difficult machining in their manufacture and which enable repairs to the register to be made without disassembling the meter.

Other features and advantages will hereinafter appear.

In the accompanying drawing:

Figure 1 is a front view of a top for meter boxes constructed in accordance with one embodiment of this invention.

Fig. 2 is a transverse sectional view of the box top shown in Fig. 1, and

Figs. 3 and 4 are sectional views of details taken on the lines 3—3 and 4—4 respectively of Fig. 1.

The illustrated embodiment of the invention comprises a box top having a body portion 5 in the form of a casting having a recessed enclosing wall 6 shaped to provide an external recess 7 in which may be located the driving mechanism 8 for the meter register. Such mechanism is shown as extending through a stuffing box 9 mounted in a threaded opening 10 in the wall 6 at the bottom of the recess 7.

The box is formed with a register-supporting surface 11 extending around the rim of the recess 7 and a register 12 is secured in place on such supporting surface by any suitable means such as clamping screws 13 extending through the base 14 of the register and into threaded openings 15 formed in bosses 16 formed in the casting wall around the recess.

A register cover formed of inexpensive easily machined parts of simple form is provided to enclose and seal the register. As illustrated, the cover comprises a two-part retaining member including a cover-supporting ring or frame member 21 having a substantially cylindrical inner wall 22 and a flat end face 23 adapted to engage the wall of the body portion around the register-supporting surface 11 and to be connected thereto with a leak-tight connection. For this purpose a sealing gasket 24 can be employed between the ring and the casting. The inner face 22 of the register ring 21 may be provided with recesses 25 as shown in Fig. 4 to accommodate the fastening screws 13 securing the register 12 in place, the recesses opening outwardly through the bottom face 23 of the register ring.

The top face 26 of the cover-supporting ring 21 has a somewhat greater radial width than the bottom face 23 and an inner shoulder 27 of rounded contour is thus formed on the inner face of the register ring so as to provide the increased facial area at the top of the ring while avoiding the presence of sharp corners or the like on the inner face of the ring such as might be difficult to machine properly.

A transparent cover 28 is supported on the outer face of the register ring 21 and held in place by a cover-retaining ring 29 having a radially inner flange 31 at its upper edge in position to overlie the edge of the glass cover which may be formed with a peripheral flange 32 for clamping the cover in position on the register ring 21. A sealing gasket 33 is provided on the end face 26 of the register ring 21 to be engaged by the edge of the glass cover and the cover-retaining ring 29 to provide a leak-tight joint, and an additional gasket 33a is interposed between the cover 28 and the retaining flange 31 of the ring 29. The parts are clamped together and secured to the wall of the casting 5 by a suitable retaining means such as threaded bolts 34 extending through holes in the superimposed rings 21, 29 and into threaded openings 36 in bosses 37 on the casting wall 5. The heads of the retaining bolts are located below the top of countersunk openings 37 in the glass-retaining ring 29 and a suitable sealing wafer 38 of wax or other sealing material is preferably deposited in the countersunk opening above the bolt head to insure a leak-tight connection.

As shown in Fig. 2, the casting 5 can be formed with a suitable flow passage 41 for the fluid being metered.

It will be apparent that the present invention provides a top for meter boxes of very simple, inexpensive construction. The casting 5 can be easily formed, while the cover-retaining parts including the register ring 21 and cover-retaining ring 29 can be made and finished by the simplest type of machining operations. No threading is required on the rings and the inner surfaces thereof, being free of threaded portions or sharp corners, can be easily machined and finished.

The invention can be variously modified and adapted and certain of the improvements can be used without others.

I claim:

1. A top for a meter box comprising a body portion having an integral enclosing wall and having a register-supporting surface on said wall, a register cover including separate superimposed rings mounted on said wall around said surface and forming the sides of said cover, a transparent cover clamped between said rings, and fastening members extending through said rings and into said body portion to secure said rings together and to said body portion in leak-tight engagement.

2. A top for a meter box comprising a body portion having an integral enclosing wall having a register-supporting surface on said wall, a register cover including separate superimposed rings mounted on said wall around said surface and forming the sides of said cover, a transparent cover having the edges thereof clamped between said rings, threaded lugs on said body portion at spaced intervals around said surface, and fastening members extending through said rings and threaded into said lugs to secure said rings together and to said body portion in leak-tight engagement.

3. A top for a meter box comprising a body having an enclosing wall provided with a recessed portion to receive a register-driving member positioned therein and passing through the wall, a register box mounted on the wall to overlie the recess and comprising a register-surrounding ring engaging the wall, a cover-retaining ring mounted on the outer face of the register-surrounding ring, the exterior surfaces of said rings forming the exterior of the box, a transparent cover extending across the opening in the cover-retaining ring and having a peripheral portion disposed between said rings, and fastening means passing through the rings to clamp the cover therebetween and to secure the rings to the wall.

4. The invention as set forth in claim 3, in which the rim of said recessed portion forms a supporting surface for a register within said register-surrounding ring.

5. The invention as defined in claim 3 wherein the register-surrounding ring has recesses on the inner surface thereof adapted to receive the register-mounting means.

FAIRCHILD WHITWORTH.

References Cited in the file of this patent

UNITED STATES PATENTS

| Number | Name | Date |
|---|---|---|
| 712,070 | Johnson et al. | Oct. 28, 1902 |
| 1,460,471 | Bassett | July 3, 1923 |
| 1,567,345 | Tilden | Dec. 29, 1925 |
| 1,637,093 | Tomlinson | July 26, 1927 |
| 2,259,910 | Rylsky | Oct. 21, 1941 |
| 2,382,728 | Kupchick | Aug. 14, 1945 |